(12) United States Patent
Hamilton et al.

(10) Patent No.: US 10,177,549 B2
(45) Date of Patent: Jan. 8, 2019

(54) INTERCONNECTION AND INSULATION MODULE FOR BUSBARS

(71) Applicant: LOGIX ENGINEERING PTY LTD, Sumner Park (AU)

(72) Inventors: Anthony James Hamilton, Indooroopilly (AU); Russell MacBean, Collaroy (AU)

(73) Assignee: LOGIX ENGINEERING PTY LTD, Summer Park, Queensland (AU)

( * ) Notice: Subject to any disclaimer, the term of this patent is extended or adjusted under 35 U.S.C. 154(b) by 0 days.

(21) Appl. No.: 15/323,667

(22) PCT Filed: Jul. 5, 2015

(86) PCT No.: PCT/AU2015/000384
§ 371 (c)(1),
(2) Date: Jan. 3, 2017

(87) PCT Pub. No.: WO2016/019410
PCT Pub. Date: Feb. 11, 2016

(65) Prior Publication Data
US 2017/0163021 A1    Jun. 8, 2017

(30) Foreign Application Priority Data

Jul. 5, 2014    (AU) ................................ 2014902589

(51) Int. Cl.
*H02G 5/00* (2006.01)
*H02G 5/04* (2006.01)
(Continued)

(52) U.S. Cl.
CPC ............. *H02G 5/04* (2013.01); *H01R 25/142* (2013.01); *H01R 25/162* (2013.01);
(Continued)

(58) Field of Classification Search
CPC .......... H02G 5/00; H02G 5/005; H02G 5/002; H02G 15/00; H02G 5/007; H02G 5/04;
(Continued)

(56) References Cited

U.S. PATENT DOCUMENTS 2,482,310 A * 9/1949 Adam ...................... H02G 5/06
174/16.2
3,113,820 A 12/1963 Norden
(Continued)

FOREIGN PATENT DOCUMENTS

| GB | 2351852 A | 1/2001 |
|---|---|---|
| JP | S49143728 | 12/1974 |
| WO | 1993002497 A1 | 2/1993 |

OTHER PUBLICATIONS

International Search Report and Written Opinion of the International Searching Authority (ISA/AU), dated Sep. 25, 2015, of International Application No. PCT/AU2015/000384 filed on Jul. 5, 2015, entire document.

(Continued)

*Primary Examiner* — Pete T Lee
(74) *Attorney, Agent, or Firm* — Sorell, Lenna & Schmidt, LLP

(57) ABSTRACT

An interconnection and insulation module is provided that is arranged to locate about a plurality of busbar pairs. Each busbar pair includes first and second busbars with an inter-busbar gap in between. The module includes opposed sides which accommodate the busbar pairs between them. Corresponding windows are formed through the opposed sides of the module and busbar separators extend from interior surfaces of the opposed sides. The bus bar separators locate inter-busbar gaps for each busbar pair between one or more of the corresponding windows. Passages are defined between the corresponding windows of the opposed sides via the inter-busbar gaps for insertion of an electrical inter- (Continued)

connection member. In use busbars can be readily interconnected by aligning their respective modules against each other and applying electrical interconnection members through the windows.

13 Claims, 16 Drawing Sheets

(51) Int. Cl.
*H02G 5/02* (2006.01)
*H01R 25/14* (2006.01)
*H02G 3/04* (2006.01)
*H01R 25/16* (2006.01)
*H02B 1/21* (2006.01)

(52) U.S. Cl.
CPC .......... *H02G 3/0456* (2013.01); *H02G 5/025* (2013.01); *H02B 1/21* (2013.01)

(58) Field of Classification Search
CPC ............. H02G 5/025; H02G 3/0456; H05K 2201/10272; H02B 1/21; H02B 1/20; H01R 25/142; H01R 25/162
See application file for complete search history.

(56) References Cited

U.S. PATENT DOCUMENTS

| | | | |
|---|---|---|---|
| 4,714,431 A * | 12/1987 | McGoldrick | H01R 25/162 174/68.2 |
| 5,151,043 A * | 9/1992 | Morgan | H01R 25/14 439/100 |
| 5,192,217 A | 3/1993 | Wittmer | |
| 6,435,888 B1 * | 8/2002 | Reed, Jr. | H01R 4/30 174/88 B |
| 2011/0290558 A1 * | 12/2011 | Jur | H02G 5/06 174/99 B |

OTHER PUBLICATIONS

International Preliminary Report on Patentability of the Patent Cooperation Treaty (PCT) International Preliminary Examining Authority (IPEA/AU), dated Jul. 29, 2016 of International Application No. PCT/AU2015/000384 filed on Jul. 5, 2015, entire document.

Supplementary Partial European Search Report of the European Patent Office (EPO, The Hague) dated May 23, 2018 of European Patent Publication No. EP 15 83 0352.9 of Logix Engineering Pty Ltd filed Jul. 5, 2015.

* cited by examiner

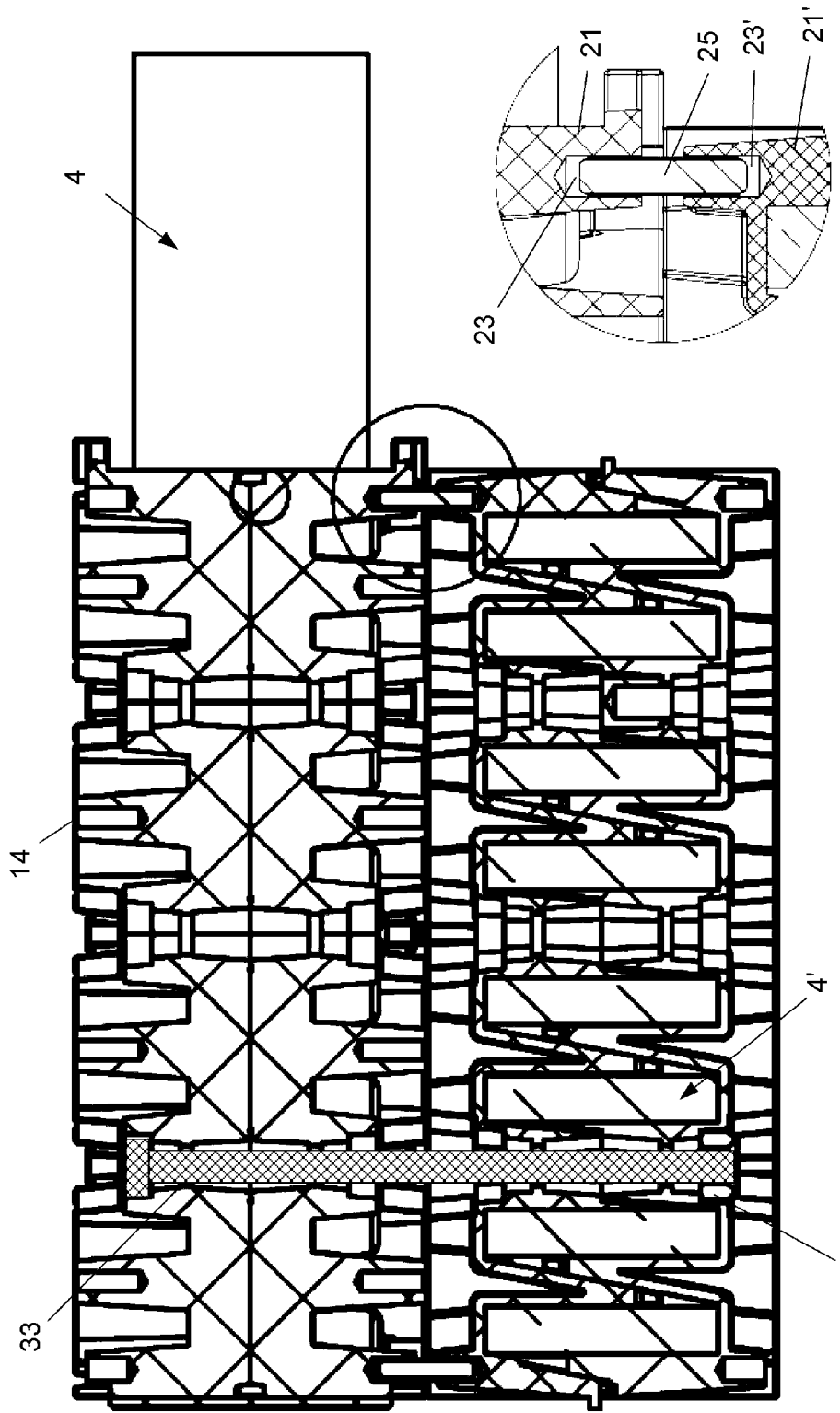

INTERCONNECTION AND INSULATION MODULE FOR BUSBARS

TECHNICAL FIELD

The invention relates generally to low voltage electrical switchgear and control gear assembly and more particular to an improved modular bus bar interconnection and insulation system for power distribution in multi-compartment switchboards.

BACKGROUND OF THE INVENTION

Low Voltage Switchgear and ControlGear Assemblies (LVSCA) are used to distribute electrical power in residential, commercial and industrial applications. For the purpose of explanation embodiments of the invention will be described in the context of high end commercial and Industrial market segments.

Within these market segments there are generally two types of LVSCA

- Commercial applications generally use electrical switchboards which predominately are for the distribution of electrical power for Light and Power applications. These would include, major shopping centres, office buildings, factories. The switchboard distributes power for lighting, air conditioning, refrigeration, air conditioning and electrical equipment including power for general use and computer installations.
- Industrial installations can use electrical switchboards but also use Motor Control Centres. MCC are used to control the starting and stopping of electrical motors in mining, water treatment, processing, conveyors, mills and like installations. These applications are generally further controlled by programmable logic controllers PLCs that are programmed for each application.

Electrical Switchboards and Motor Control Centres are similar in their application but differ in the type of equipment installed.

- Electrical switchboard predominately use Switchgear
- MCC use a combination of Switchgear and Controlgear i.e. Motor Control.

Generally speaking Motor Control Centre manufacturing is considered more technically challenging than Electrical Switchboard manufacturing and requires a higher degree of engineering.

Most switchboards are manufactured from sheet steel panels bolted together to form an enclosure. This is fitted with a busbar system mounted on insulated busbar supports and depending on the technical requirements the switchboard will be divided by sheetmetal partitions in to various compartments. Compartments can generally be defined as follows,

- Main incoming functional unit
- Busbar zone
- Outgoing functional unit
- Cable zone These compartments are generally segregated by sheetmetal partitions.

In all applications where electrical Switchboards and MCCs are involved there is a minimum of one incoming supply, but there may be more, which connect to a main busbar system that generally runs the length of the LVSCA. There are then branch busbars that further distribute power, generally vertically, through the LVSCA the final circuits connect to switchgear and control gear which is connected to these branch busbars.

Traditional construction provides for various sizes of busbar for these applications e.g. a main busbar rated at 4000 A may consist of 4×80×10 mm busbars per phase and neutral. A branch busbar of 1000 A may consist of 1×80×10 mm busbar per phase and neutral.

Typical ratings of LVSCAs are as follows,

Commercial Electrical switchboards
- Voltage 380V-440V
- Current ratings 1250 A, 1600 A, 2500 A, 3200 A, 4000 A
- Dielectric Withstand Voltage 2500V
- Fault Rating 50/65 kA
- Creepage & clearance Distance 13 mm MCC
- Voltage 380V-690V
- Current ratings 1250 A, 1600 A, 2500 A, 3200 A, 4000 A, 6300 A
- Dielectric Withstand Voltage 2500/6000V
- Fault Rating 50/65/80 kA (up to 100 ka rarely)
- Creepage & clearance Distance 13/16/19 mm Traditional LVSCA have relied on open bare air insulated busbar systems. In particular the commercial application for switchboards are generally custom built with little or no repetitive assembly or component techniques use. Busbars are generally air insulated and supported on various types of custom or moulded busbar supports. Busbar supports are fitted where it is convenient for the manufacturer, or at maximum spacings. Insulation is normally not used or if it is used it is heatshrink insulation with separate boots over the busbar joints. This is labour intensive in its installation and application.

FIG. 1. Shows a portion of a prior art LVSCA 100, including horizontal bus bars 1 and vertical bus bars 3. Vertical bus bar insulator assembly 5 and horizontal bus bar insulator assembly 7 are also shown in FIG. 1. The connection means comprises steel mounting brackets 11 with slip-on insulator blocks 13. Both sets of insulator assemblies 5, 7, have a plurality of components. Interconnecting holding bolt assemblies 9 also involve a number of components. The bars 1, 3 of the bus bar assemblies are exposed to surrounding atmospheric conditions and contaminates. Air insulated busbars require significant inter-bar spacing for both phase-to phase and phase-to-earth. This is to reduce the risk of foreign matter building up and creating short circuit conditions or arcing fault conditions between the bars. Foreign matter can be any number of things, dust, rodents, swarf from drilling or cutting, insects, carbon. In addition, the bare bus bars 1, 3 present a shock risk to a person doing maintenance or modifications to the LVSCA.

It is an object of the invention to provide an apparatus to assist in interconnection of busbars that overcomes one or more of the problems of the prior art that have been discussed above.

SUMMARY OF THE INVENTION

According to a first aspect of the present invention there is provided an interconnection and insulation module arranged to locate about a plurality of busbar pairs, each busbar pair including first and second busbars with an inter-busbar gap therebetween, said module including:
- opposed sides for accommodating the busbar pairs therebetween;
- corresponding windows formed through the opposed sides; and formations extending from interior surfaces of at least one of the opposed sides to locate inter-busbar gaps for each bus bar pair between one or more of the corresponding windows;

whereby passages are defined between the corresponding windows of the opposed sides via the inter-busbar gaps for insertion of an electrical interconnection member.

In a preferred embodiment of the invention the windows formed through the opposed sides are in respective square arrays.

Preferably the support housing comprises first and second opposed portions. It is preferred that busbar dividers extend from internal walls of the first and second portions.

Opposed ends of the module may include unidirectional mating formations whereby a number of modules may be interconnected end to end so that all of the number of modules are orientated in the same direction.

The module may include alignment formations located around a periphery of the module for assisting face-to-face alignment of windows of the module with another corresponding module in use.

The formation for locating the bus bar pairs preferably includes a number of separators which extend from one or more internal walls of the support housing and which penetrate a space between pairs of the busbars.

An endplate may be mounted across one end of the housing.

According to a further aspect of the invention there is provided an insulated busbar assembly comprising:
a first plurality of parallel busbars;
a module as previously described, disposed about the first plurality of parallel busbars.

The busbar assembly may comprise a second plurality of parallel busbars orthogonal to the first plurality of busbars and a second module of the previously described type disposed about the second plurality of parallel busbars wherein windows of the first module and windows of the second module are aligned.

One or more interconnection members, for example in the form of bolts or pins, may be disposed through respective of the aligned windows thereby interconnecting busbars of the first plurality of busbars with busbars of the second plurality of busbars.

Each of the plurality of busbar assemblies are preferably contiguously covered by modules of the previously described type.

According to another aspect of the present invention there is provided an insulated busbar assembly comprising:
a first busbar assembly including a plurality of parallel busbars;
a first plurality of interconnection and insulation modules disposed contiguously about the busbar assembly.
Preferably each of the modules comprise:
a support housing encircling the busbars;
a number of dividers extending from one or more internal walls of the support housing to locate the busbars and to maintain electrical separation therebetween;
a regular array, or "matrix" of windows formed in the support housing;
detachable covers corresponding to the windows;
wherein the dividers and the windows are located relative to each other for a conductive member inserted through a window to come into electrical connection with a busbar.

The insulated busbar assembly may include one or more additional busbar assemblies each having respective additional pluralities of interconnection and insulation modules disposed contiguously thereabout wherein conductive members electrically interconnect busbars of the first busbar assembly and of the one or more additional busbar assemblies. The additional busbars fit into an overall matrix structure of the busbar assembly.

According to a first aspect of the present invention there is provided an interconnection and insulation module for busbars, the module comprising:
a support housing encircling the busbars;
a number of dividers extending from one or more internal walls of the support housing to locate the busbars and to maintain electrical separation therebetween;
a regular array of windows formed in the support housing;
detachable covers corresponding to the windows;
wherein the dividers and the windows are located relative to each other for a conductive member inserted through a window to come into electrical connection with a busbar.

Preferably the windows are arranged in respective square arrays or matrices.

In a preferred embodiment of the invention the support housing comprises first and second opposed portions wherein the dividers extend from internal walls of the first and second portions.

It is preferred that opposed ends of the module include unidirectional mating formations whereby a number of modules may be interconnected end to end so that all of the number of modules are orientated in the same direction.

The busbars may be provided in pairs, in that case it is preferable that the module includes a number of separators which extend from one or more internal walls of the support housing and which penetrate a space between pairs of the busbars.

The module may include an endplate mounted across one end of the housing.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 3G is a cross sectional view along line B-B of FIG. 3E.

FIG. 3H is a detail of a portion of FIG. 3G showing an alignment rod in detail.

DESCRIPTION OF THE PREFERRED EMBODIMENT

Figure 1:
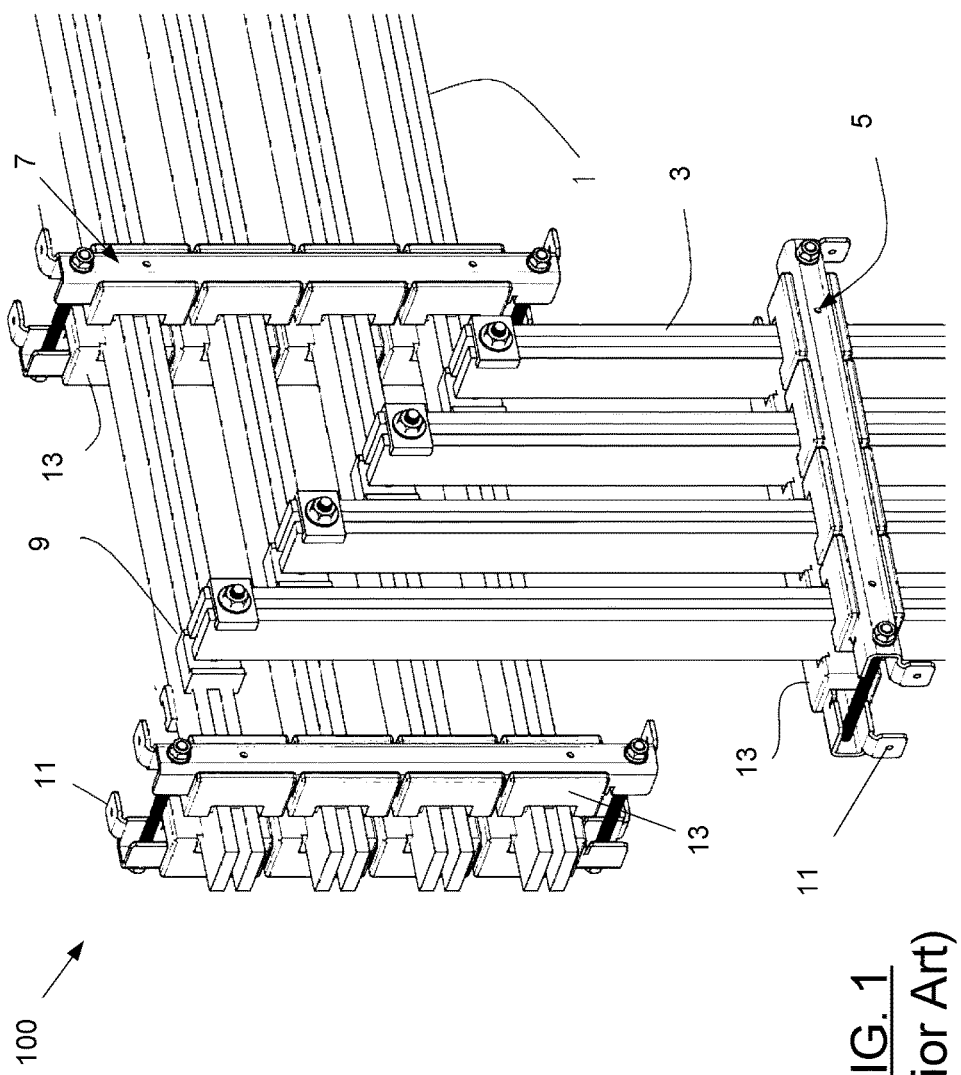
FIG. 1 is a view of a prior art horizontal to vertical bus bar joining detail.
Figure 2:
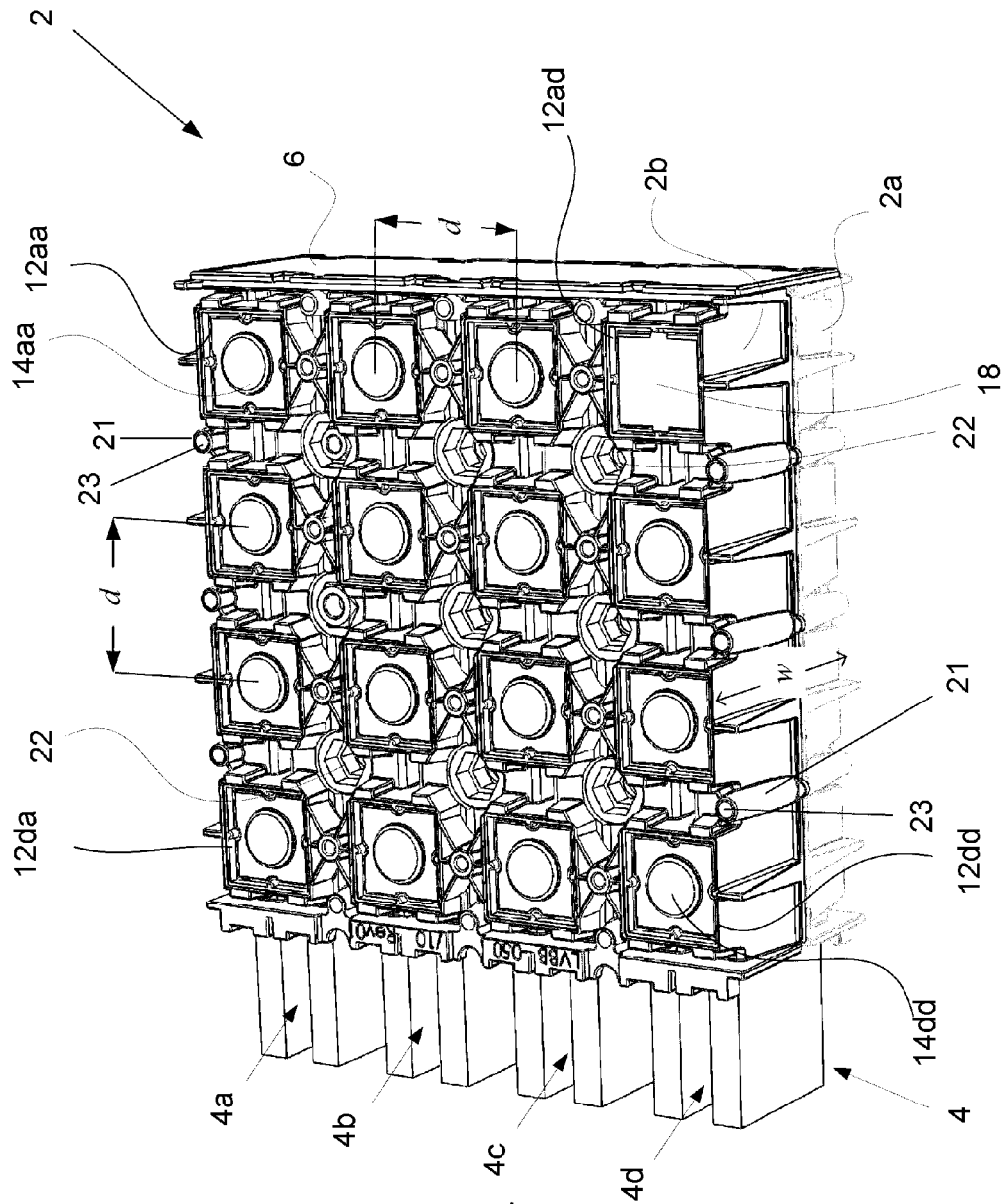
FIG. 2 is a view of bus bar support module according to a preferred embodiment of the present invention shown housing lengths of busbars.

Referring now to FIG. 2, there is depicted a bus bar insulation and interconnection module 2 according to a preferred embodiment of the present invention shown in use about the end of a busbar assembly 4 comprised of four pairs of busbars 4a, 4b, 4c, 4d. The busbar assembly 4 that is shown in the figures extends for a much greater distance than is actually visible in FIGS. 2 and 3.

Figure 3:
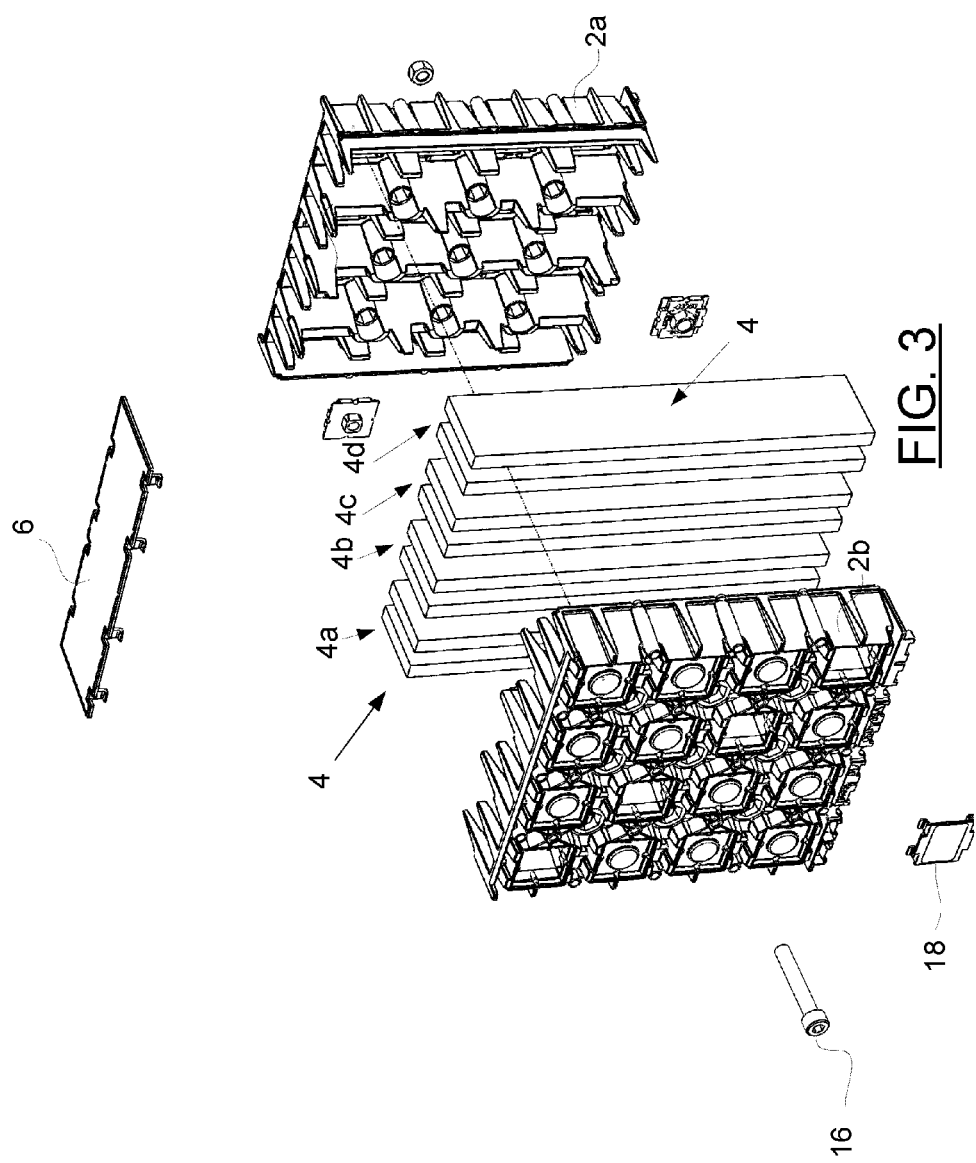
FIG. 3 is an exploded view of the bus bar support module of FIG. 2.

As shown in FIG. 3, which is an exploded view of the insulation and interconnection module 2, the module 2 comprises a housing formed of first and second parts 2a, 2b which are located on opposite sides of the busbar assembly 4. The first and second parts 2a, 2b of the housing cooperate to sandwich the busbar assembly 4 therebetween. In the presently described preferred embodiment of the invention the first and second parts 2a, 2b are identical however that need not necessarily be the case in other embodiments of the invention.

Where the busbar assembly 4 terminates within the insulation module 2 an end plate 6 is provided to cap the module 2 as shown.

Figure 4:
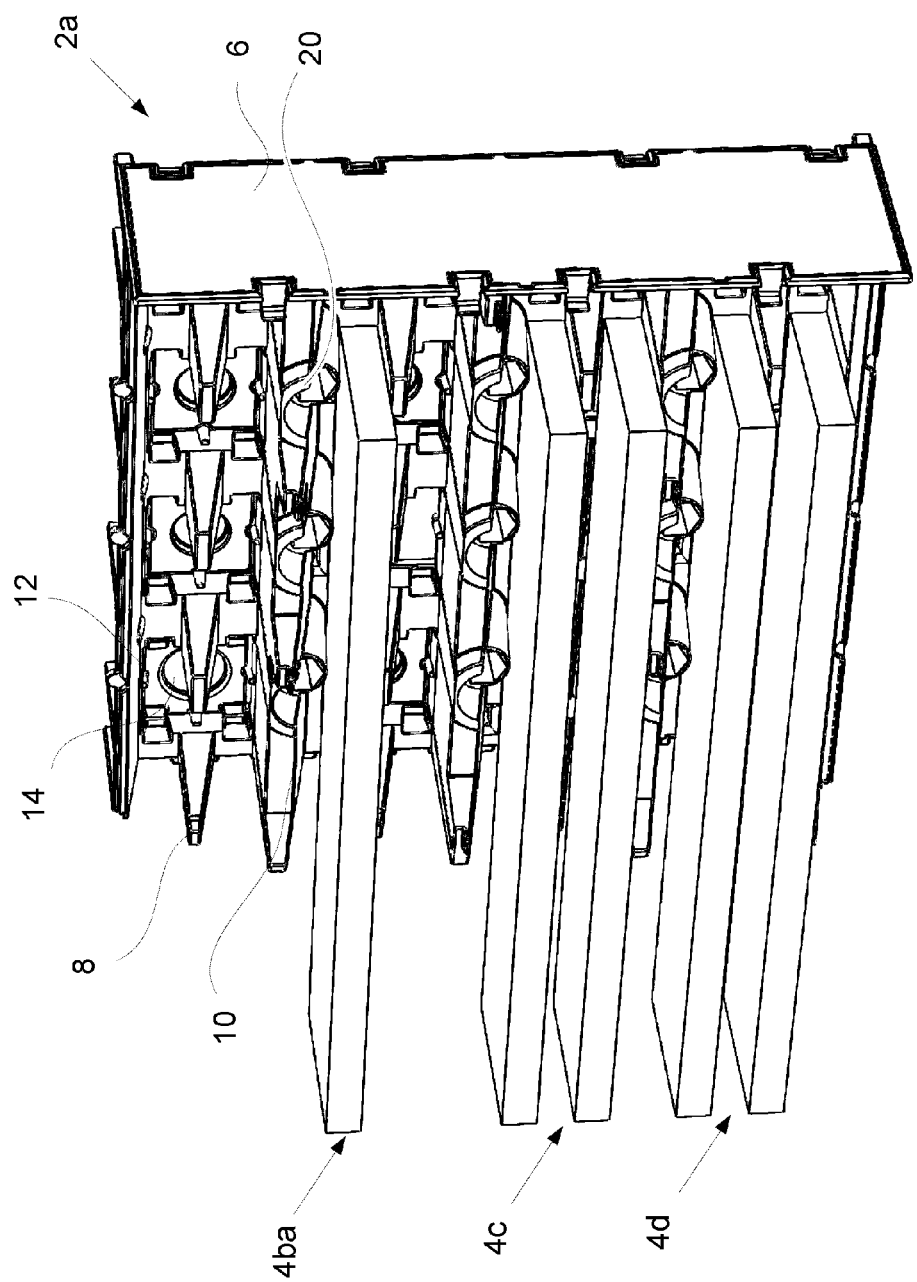
FIG. 4 is an interior view of one half of the bus bar support module of FIG. 2 shown supporting a number of busbars.

Referring now to FIG. 4, there is shown a view of the inside of the first portion 2a of the insulation module 2 with pairs 4c and 4d of the busbar assembly 4, and one conductor 4ba of pair 4b, shown located inside the portion 2a. It will be observed that the inside of the portion 2a of the insulation and interconnection module 2 is integrally formed with inwardly extending, spaced, apart formations in the form of busbar separators 8 which act to separate and hold the members of each of the pairs of busbars of the busbar assembly. The inside of the portion 2a of insulator module 2 is also integrally formed with continuous longitudinal busbar pair dividers 10 which act to physically and electrically separate the pairs of busbars 4a, 4b, 4c and 4d from each other along the length of the insulation and interconnection module 2.

Figure 5:
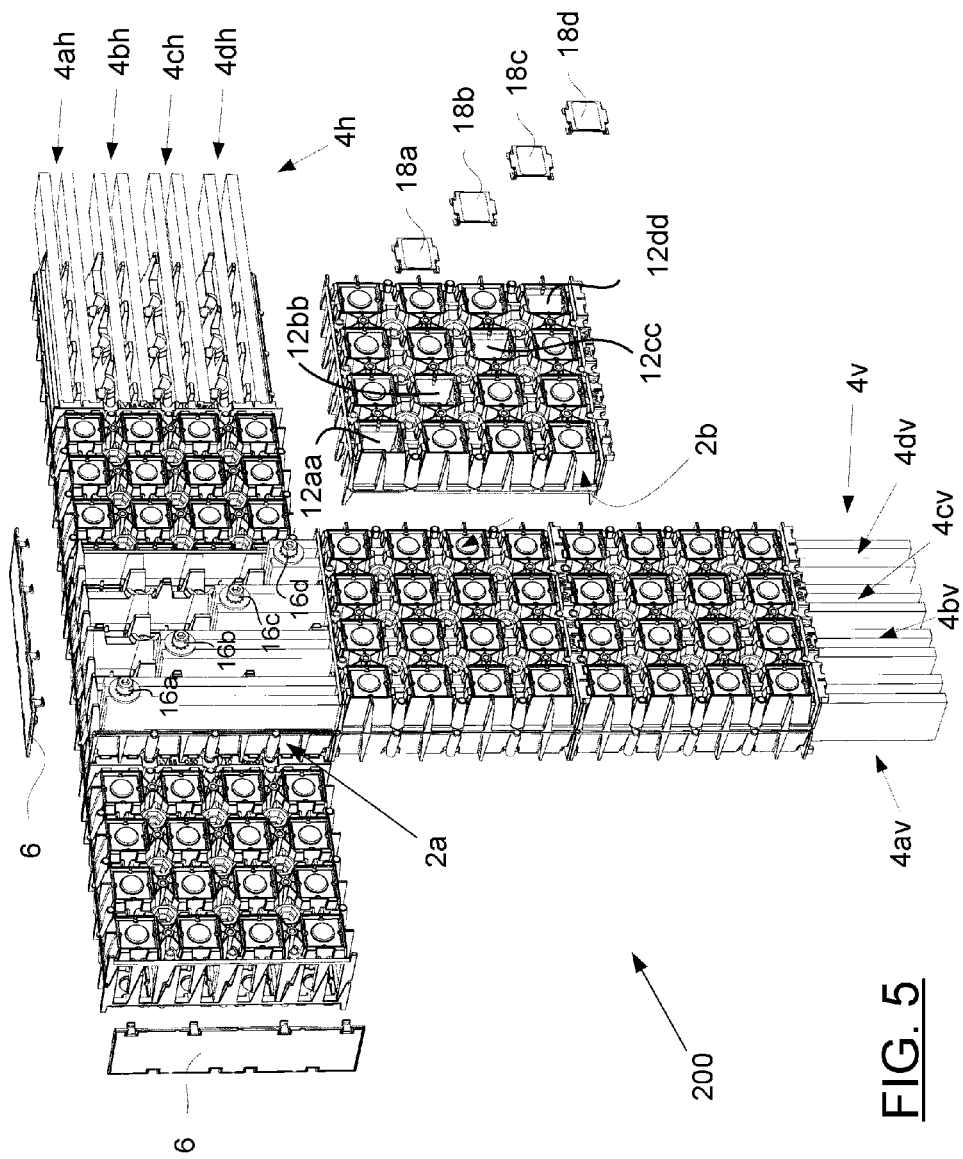
FIG. 5 is an exploded view of a number of the modules of FIG. 2 in use to produce a busbar assembly comprising interconnected horizontal and vertical portions.

Referring again to FIG. 2, a matrix of 16 windows 12aa to 12dd is formed through an outer wall, or "face", of portion 2a of insulator module 2. The windows 12aa to 12dd (generally referred to herein as "12") are covered by detachable covers 14aa to 14dd respectively (generally referred to herein as "14"). The centre of each window 12 is located over a mid-line between the busbars of each pair of busbars 4a to 4d. Consequently, subsequent to removing one of the covers 14 an electrically conductive member in the form of interconnection bolt 16 (shown in FIG. 3) can be inserted between each busbar of a pair of the busbars of busbar assembly 4 and also between adjacent busbar pair separators 8 and fastened in place. The pin is electrically connected to each busbar of the busbar pair by virtue of the side of the pin being in electrical contact with the inner, opposed sides of each busbar of the busbar pair. Furthermore, the interconnection bolt may have a length that is equal to about twice the width w of the module 2. Accordingly, as shown in FIG. 5 the bolt 16 is able to penetrate through two, or more, insulation modules to thereby electrically interconnect paired busbars together. For example, in FIG. 5, which is a partially exploded view, four bolts 16a, 16b, 16c and 16d electrically interconnect horizontal busbar pairs 4ah, 4bh, 4ch and 4dh to vertical busbar pairs 4av, 4bv, 4cv and 4dv respectively.

The matrix of windows 12aa to 12dd are spaced to comply with the DIN standard. The fundamental DIN spacing is 25 mm. The Inventor initially developed the module 2 to provide a matrix system based around a 2 mm increment. The Inventor found that in practice 25 mm was too small an increment for the envisaged use so the spacing was doubled to 50 mm, indicated as distance "d" in FIG. 2. Consequently, a preferred embodiment of the invention uses 50×10 MM copper busbars (i.e. each of the busbars of pairs 4a to 4d) in FIG. 2 that are covered by one or more insulation modules 2.

As shown in FIGS. 2 and 3, each interconnection and insulation module 2 can accommodate 8 busbars (i.e. the four pairs of busbars 4a to 4d) of 50×10 mm section, being 3 phases and neutral. As will be described further shortly, the insulator modules can be assembled in continuous lengths, heights and depths to create an interconnected busbar assembly where connections can be made on a 50 mm grid.

Figure 3A:
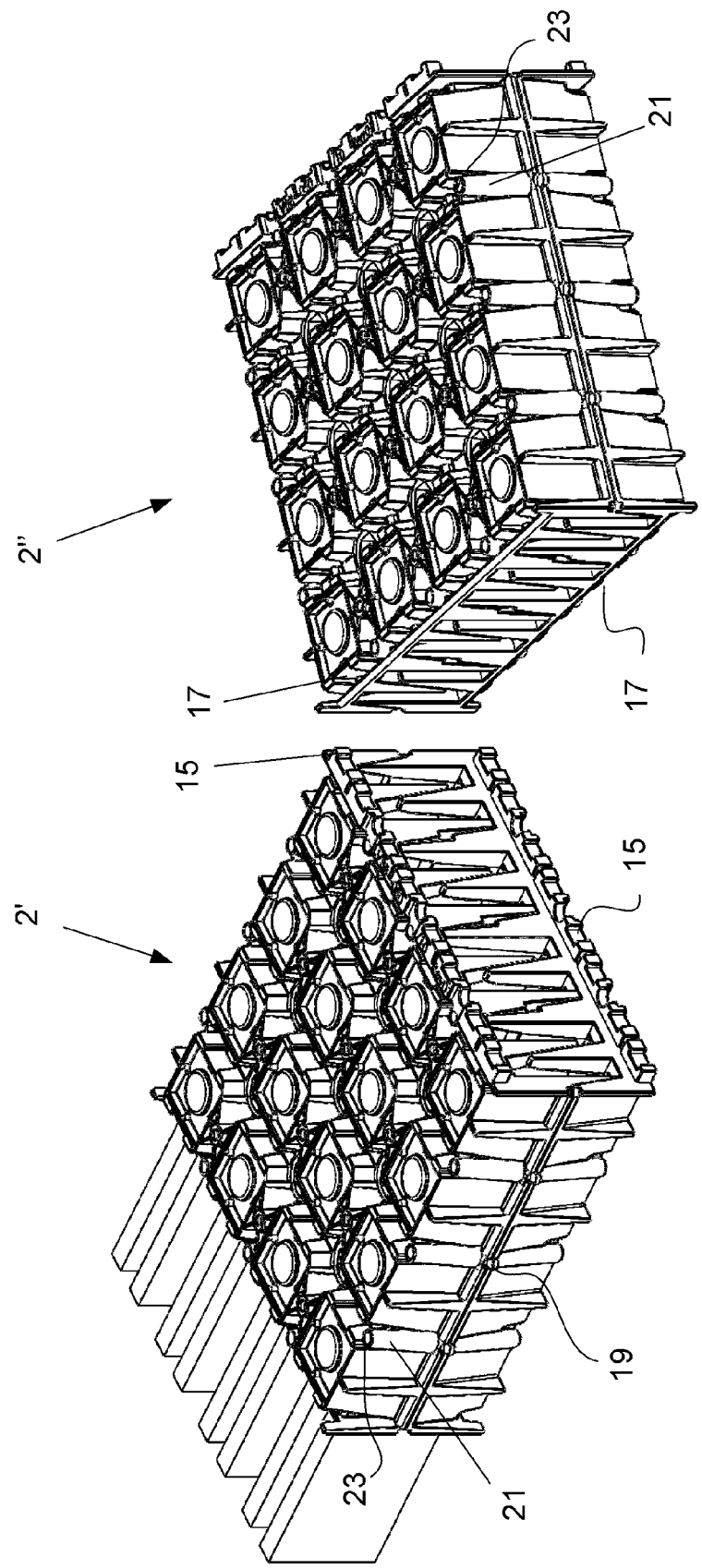
FIG. 3A shows end-to-end complementary mating features of the bus bar support module.

In the presently described preferred embodiment the interconnection and insulation module 2 is designed so adjacent modules most be orientated in a common direction for interconnection. Assembly of multiple modules 2 on a busbar assembly 4 is intuitive because there is only one way to fit them as adjacent modules interlock side by side in a specific direction. This can be seen by reference to FIG. 3A which shows the end to end complementary mating features 15 and 17 of two blocks 2' and 2". Flange 15 of block 2' interlocks end to end with the recesses of flange 17 of block 2" to thereby create a continuous insulator of indefinite length. Tabs 19 on the side of the busbar insulation modules 2 also interlock when the modules 2 are mounted side by side.

Figure 3D:
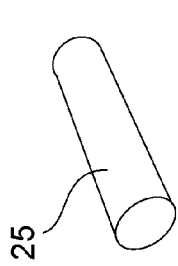
FIG. 3D is a detail view of an alignment rod.
Figure 3C:
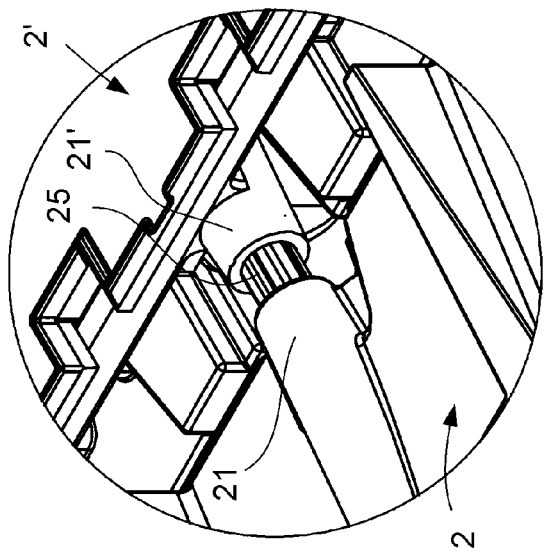
FIG. 3C is a detail view of a portion of FIG. 3B.
Figure 3B:
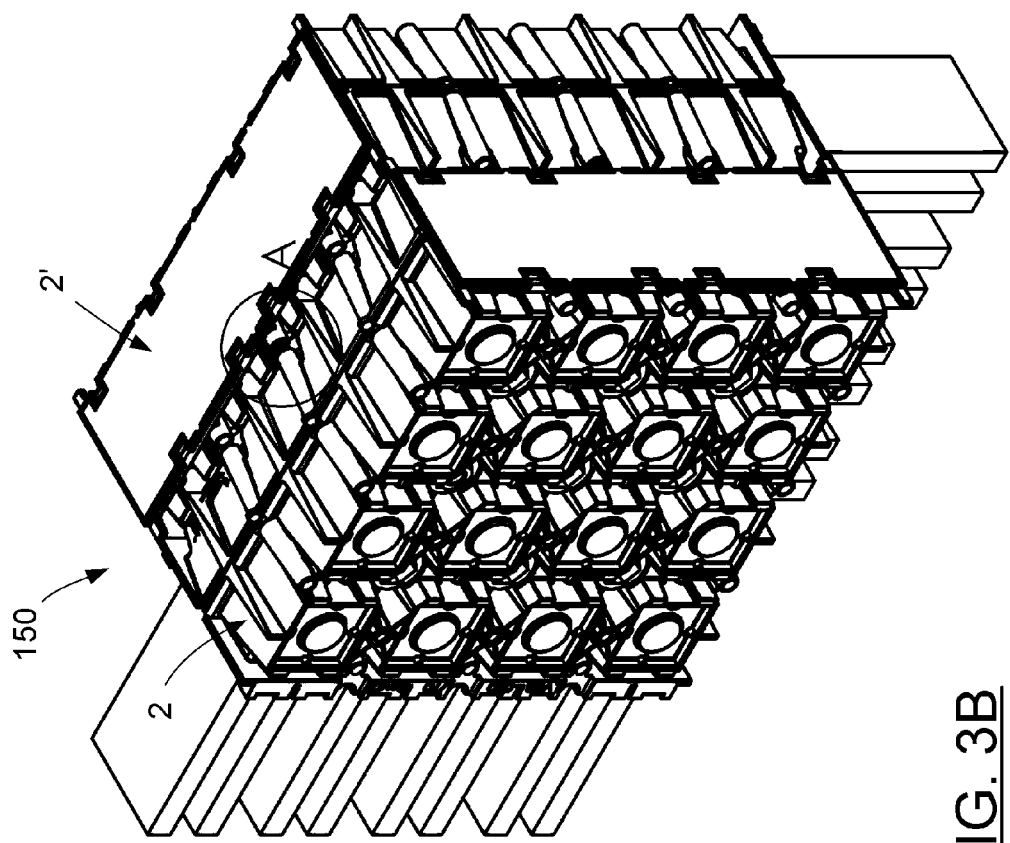
FIG. 3B shows two busbar modules brought into alignment against each other.

Posts 21 are integrally formed around the edge of each of the portions 2a and 2b of the module 2. The posts are each formed with a bore 23 at their outer end. As shown in FIGS. 3B and 3C, in order to align an assembly of two modules 150 face-to-face, i.e. with the windows of one module 2 brought into alignment with the windows of a second module 2', one end of an alignment rod 25, shown in FIG. 3D, is received into the bore 23 of post 21 so that the other end of the alignment rod 25 protrudes outwardly and is received into the bore of post 21' on module 2' as shown in FIGS. 3B and 3C. In this way two or more modules can be brought together with the matrix of windows of the modules in alignment. It will be realised that other arrangements for assisting in aligning the modules face-to-face are possible.

Figure 3E:
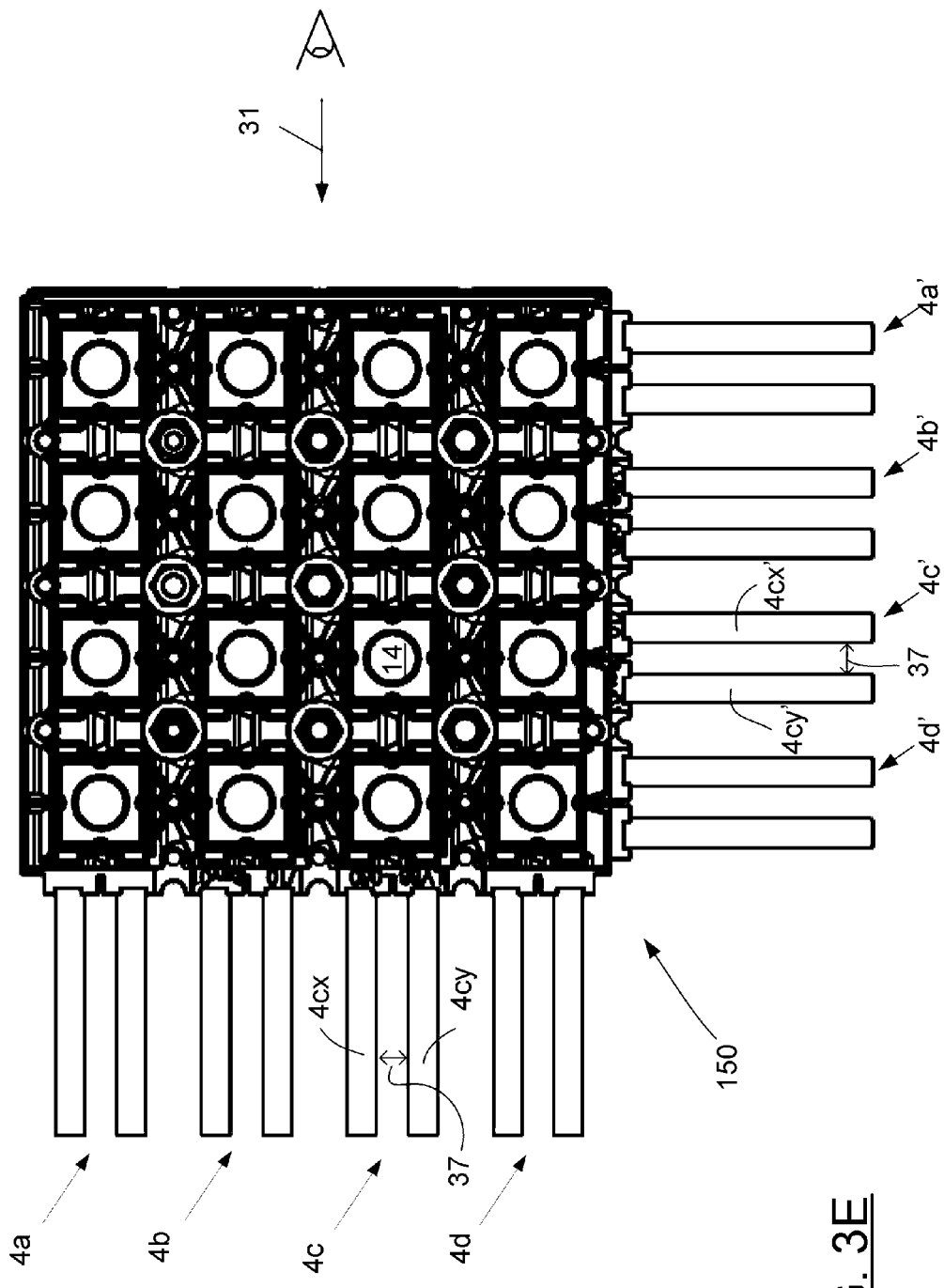
FIG. 3E is a top plan view of the assembly of FIG. 3B.
Figure 3F:
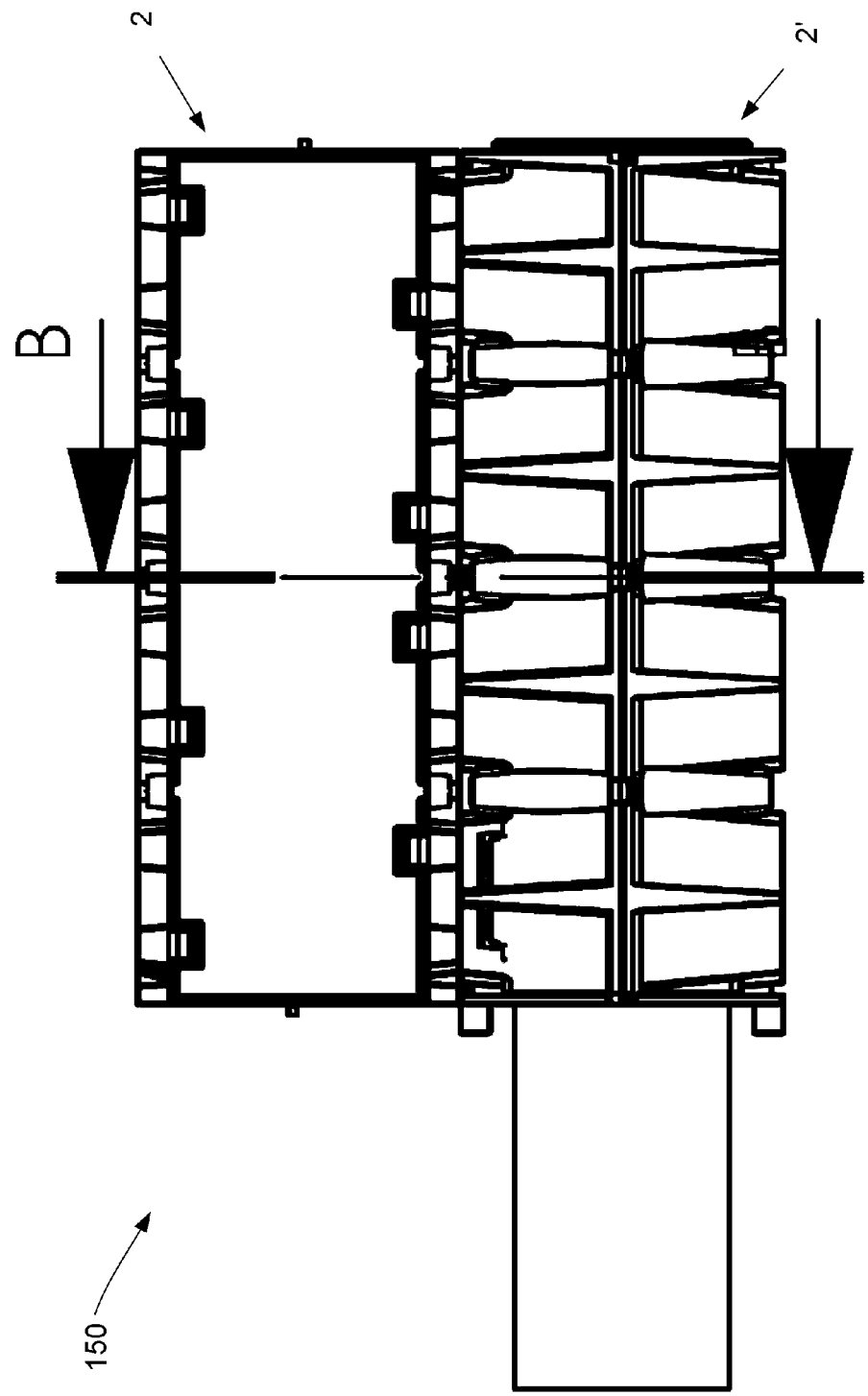
FIG. 3F is an end view of the assembly of FIG. 3E.

FIG. 3E is a top plan view of the assembly 150 of FIG. 3B whereas FIG. 3F is an end view when viewed along arrow 31 as shown in FIG. 3E. FIG. 3G is a cross sectional view along line B-B of FIG. 3E. FIG. 3G shows how the two modules 2 and 2' are bolted together by clamping bolt 33 whose head is captured by the upper face of module 2 and whose lower tip is captured by nut 35 in the lower module 2'. The clamping bolt 33 is kept apart and insulated from the busbars 4. FIG. 3H is a detail of a portion of FIG. 3G showing the alighment rod 35 in detail.

Figure 3I:
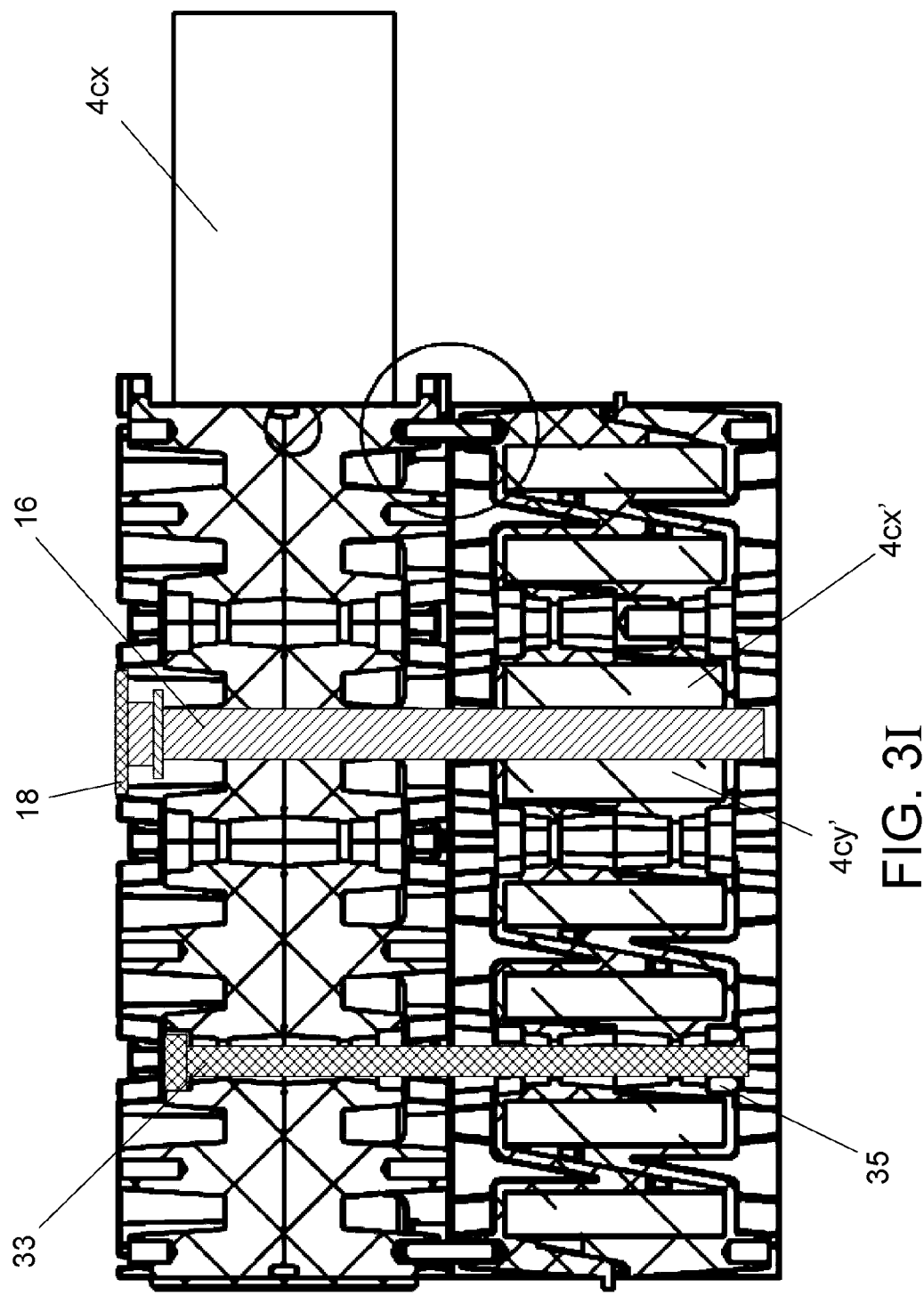
FIG. 3I is a cross sectional view along line B-B of FIG. 3E showing an electrical interconnection pin in place.

In order to make a connection between busbar pairs 4c and 4c' as shown in FIG. 3I, window cover 14 (shown in FIG. 3E) is removed and so too are corresponding window covers on the underside of the module 2 and also on the top of the lower module 2'. Consequently a passage is defined between the corresponding windows of the opposed sides via the inter-busbar gaps 37 (identified in FIG. 3E). A conductive pin or bolt 16 is inserted through the corresponding gap 37 between busbars 4cx, 4cy and 4cx' and 4cy'. The pin is slightly oversized relative to the width of gap 37 and so presses firmly against the innersides of the busbars to make a good electrical connection. A window cover 18 is snap fitted over the top of the conductive pin 16.

The busbar support module 2 provides continuous phase to phase isolation and phase to earth isolation. Therefore it eliminates as far as practical the possibility of creating an electrical short circuit or arcing fault. In the extremely unlikely event of an arcing fault occurring it is virtually impossible for the arc to be propagated and cause significant damage.

Referring again to FIG. 5, where the detachable window covers 14 have been removed to allow for insertion of the interconnection bolts 16a-16d, bolt cover plates 18a-18d are provided which clip into the windows 12aa-12dd and thereby cover the heads of the bolts. The bolt cover plates 18a-18d have a different visual appearance to the that of the detachable window covers 14 and so the location of the bolts is readily apparent to a user after an interconnection has been made between horizontal and vertical busbar assemblies 4h and 4v. It is also possible to fit view windows enabling thermal temperature imaging of busbar joints.

Consequently, three phase power and electrical earth can be distributed from the horizontal busbar assembly 4h to the vertical busbar assembly 4v, and vice versa.

A preferred embodiment of the invention described herein uses one size of busbar but multiples of them for all ratings so for instance a 4000 A main busbar would consist of 8×50×10 mm busbars per phase and neutral and a 1000 A branch busbar would consist of 2×50×10 mm busbars per phase and neutral.

Figure 6:
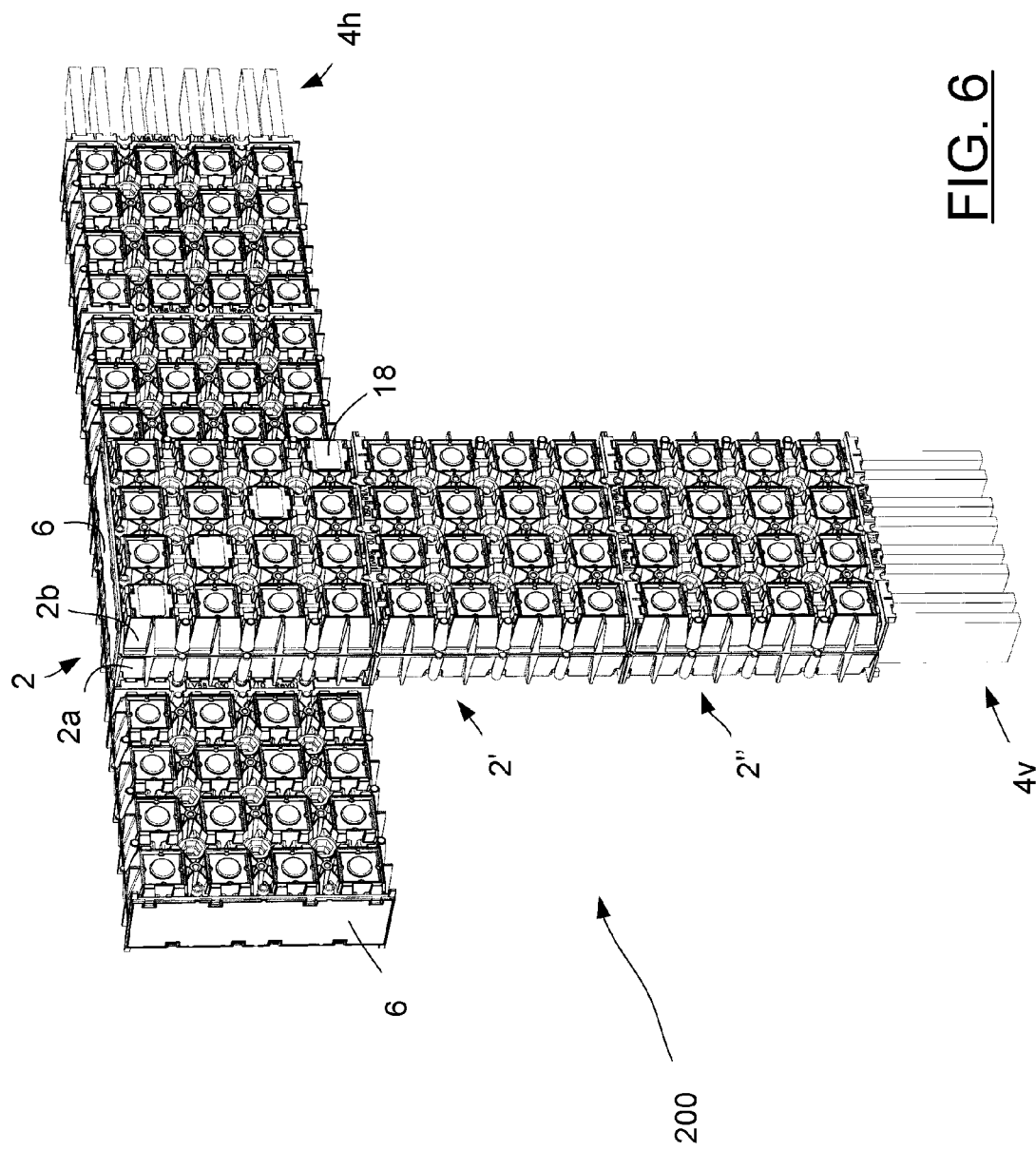
FIG. 6 is a non-exploded view of the assembly of FIG. 5.

Referring now to FIG. 6, the assembly 200 of FIG. 5 is shown in an assembled form with the two halves 2a and 2b of the interconnection and insulation module 2 fitted together. The two halves may be formed to snap fit together or alternatively they may be bolted together by bolts that protrude through bolt holes 22 (visible in FIG. 2) and corresponding bolt hole sleeves 20 of the two halves 2a and 2b of the module 2. FIG. 6 also shows how the end plates 6 have been fitted to cover blind ends of the busbar assemblies 4h and 4v. It will also be observed that the bolt cover plates 18 have been fitted into the windows that correspond to the bolts 16 and located over the ends of the bolts 16. As discussed in relation to FIG. 3A, ends of the modules 2, 2', 2" are formed with complementary snap fit formations so that adjacent interconnection and insulation modules 2 snap fit to each other end-to-end to form an elongate, contiguous covering over the busbar assemblies as shown in FIG. 6.

Figure 7:
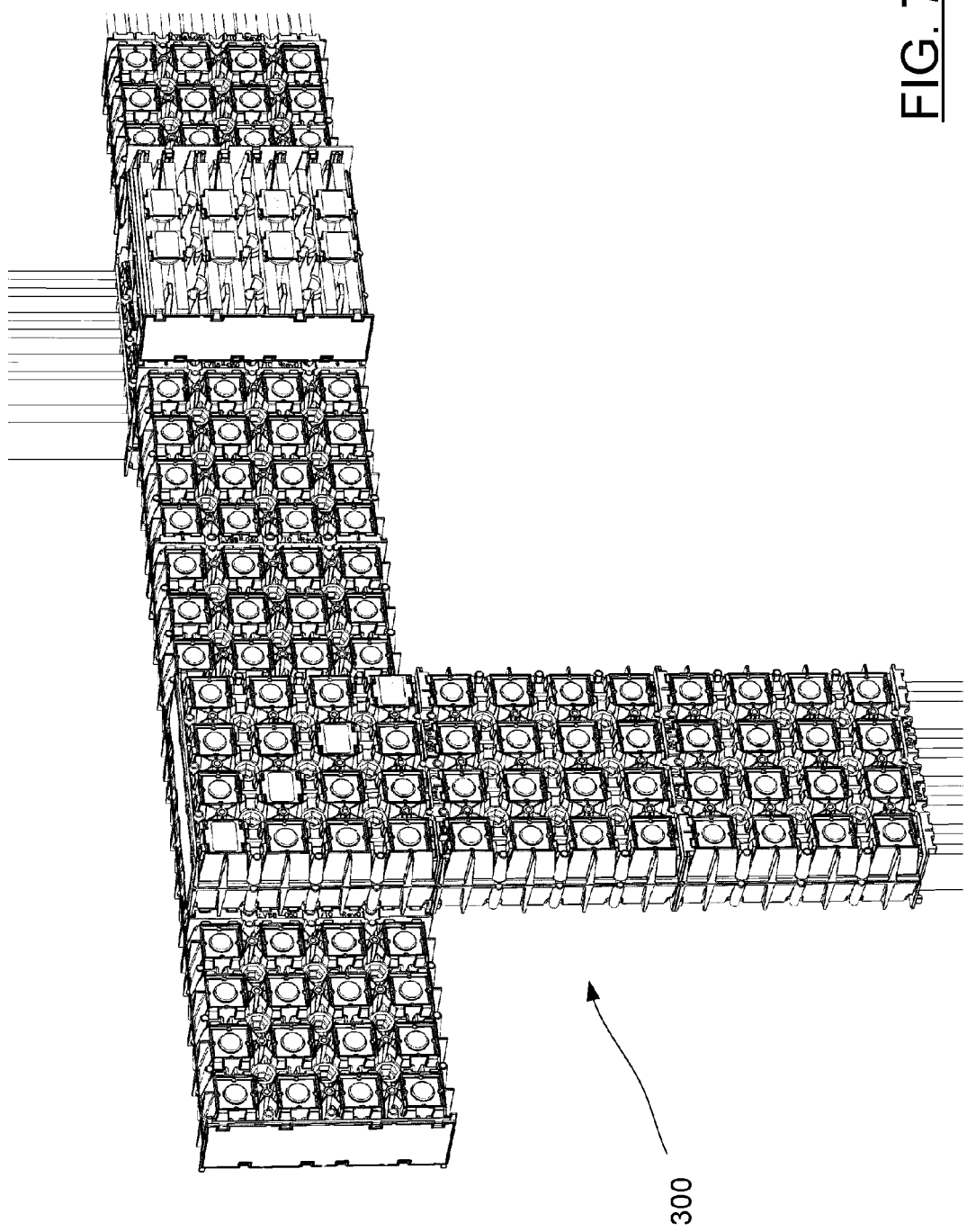
FIG. 7 is a first view of an insulated busbar assembly created by the use of a plurality of the support modules of FIG. 2.
Figure 8:
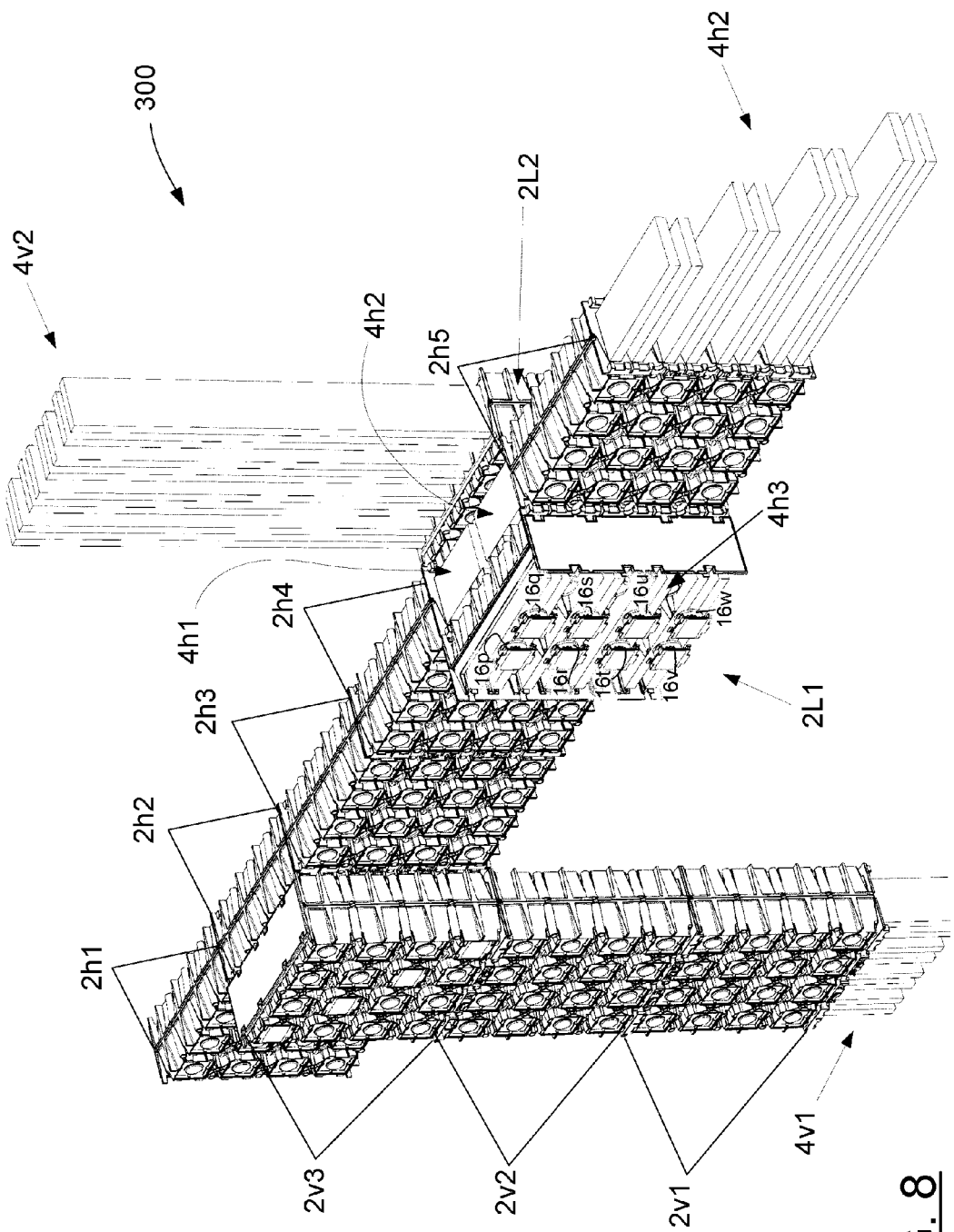
FIG. 8 is a second, exploded view of the insulated busbar assembly of FIG. 7.

FIG. 7 and FIG. 8 are two views of an insulated busbar assembly 300 according to an embodiment of the present invention that includes four busbar assemblies.

With reference to FIG. 8 first vertical busbar assembly 4v1 extends upwardly and is coupled to a first horizontal busbar assembly 4h1 by means of bolts that extend across interconnection blocks 2v3 and 2h2 and which electrically interconnect each of the busbars in the busbar assemblies 4v1 and 4h1.

A second horizontal busbar assembly 4h2 is coupled end-to-end to the first horizontal busbar assembly 4h1 by means of a horizontal busbar assembly 4h3 which is entirely housed within module 2L1. The module 2L1 spans the opposed ends of busbar assemblies 4h1 and 4h2 and electrically interconnects them by means of bolts 16p to 16w. The outer portion of module 2L1 is not shown to reviewal the inner busbar 4h3.

Of bolts 16p to 16w, bolts 16p, 16q, 16r, 16u, 16v and 16w are of a length that corresponds to about two thicknesses of a module 2. In contrast, bolts 16t and 16s have a length equivalent to about three times the thickness of a module 2 in order that they can span module 2L1, busbars 4h1 and module 2L2 to thereby interconnect the two innermost pairs of horizontal busbar assemblies 4h1 and 4h2 to the two inner most pairs of vertical busbar assembly 4v2.

Bolts, of length corresponding to the thickness of two modules electrically interconnect the outermost pairs of busbars of the second vertical busbar assembly 4v2 to the top and bottom busbars of horizontal busbar assemblies 4h1 and 4h2 respectively. Consequently, the order of the three phases and neutral is preserved across the busbar assemblies 4v1, 4h1, 4h2 and 4v2. Of course, it is possible to invert, or otherwise re-order, the interconnections by selecting different positions for the various interconnection bolts that span the modules and electrically interconnect the pairs of busbars.

Figure 9:
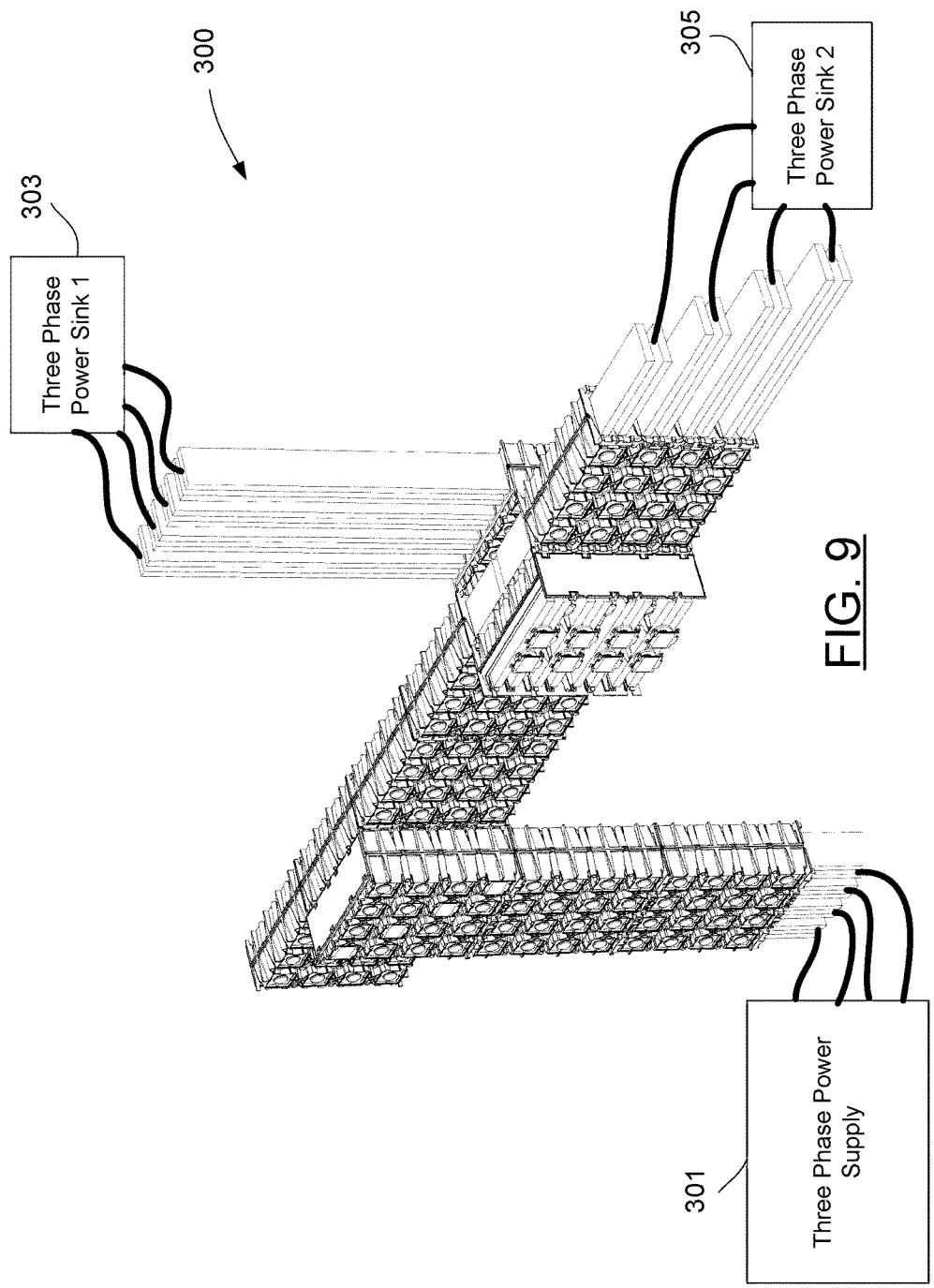
FIG. 9 is a diagram showing the insulated busbar assembly of FIG. 7 in use.

FIG. 9 is a diagram showing the insulated busbar assembly 300 of FIG. 7 in use, i.e. distributing electrical power from a power source 301, for example the output side of a three phase transformer to two power sinks 303, 305, for example air conditioning plants.

Traditionally joints between busbar sections, be they horizontal to vertical, shipping breaks, or horizontal to horizontal, are made with bolted connections. The embodiments of the invention provide for traditional bolted connections to be utilised but it is also a development that the insulated housing is used as a compression clamping connection.

Figure 10:
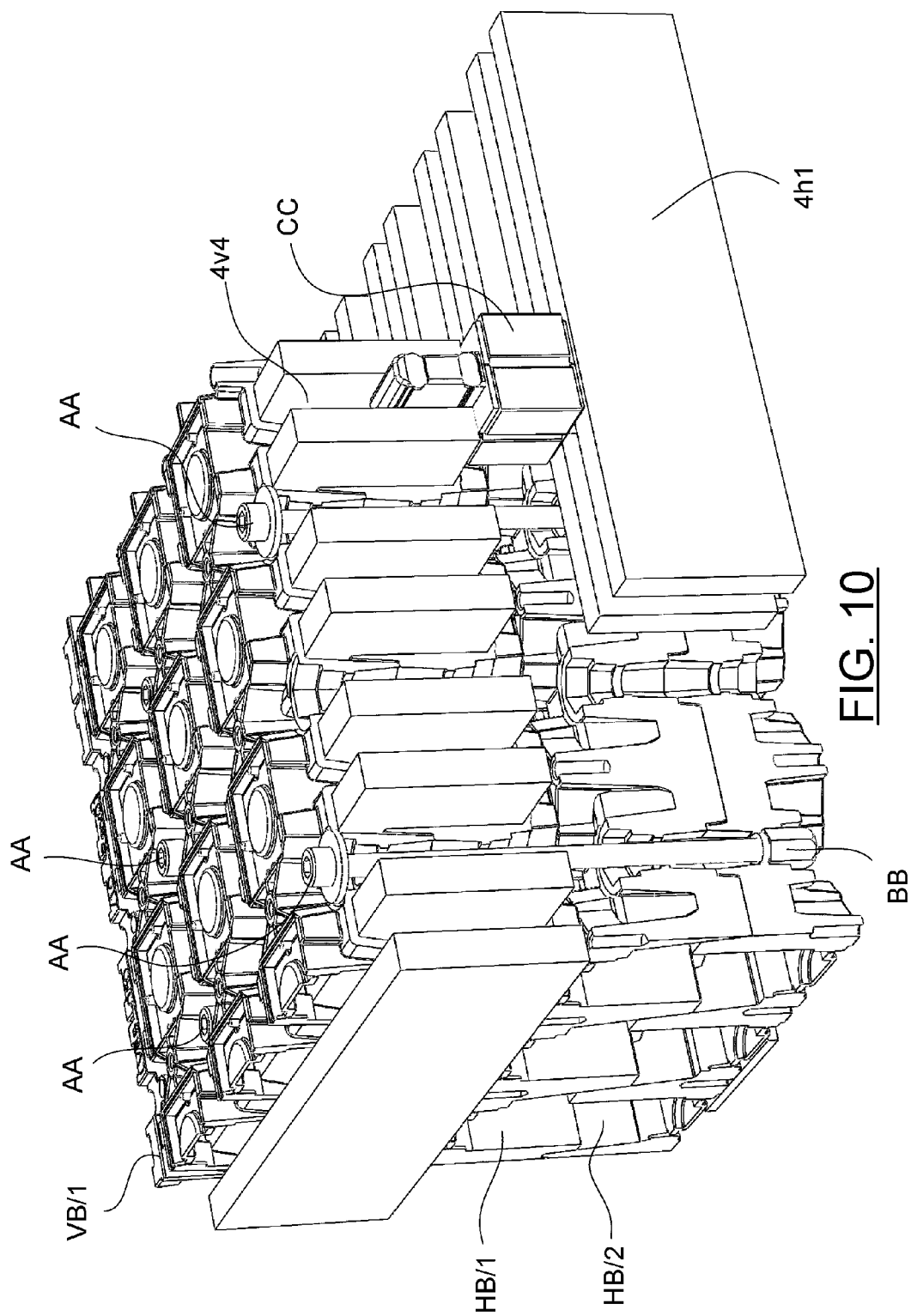
FIG. 10 shows the clamping of two busbars together to form an electrical interconnection.

Referring now to FIG. 10, it is possible that by the interlocking of the insulation housings to each other that a high pressure clamp connection can be made between the horizontal and vertical busbars. The advantage of this connection system is that no space is used to make the connection between the horizontal and vertical busbars. This means that switchgear and controlgear devices can be fitted where the traditional bolted connection would have been thus ensuring maximum utilization of the space inside the LVSCA.

The various items in FIG. 10 are as follows:
VB/1—Vertical busbar insulation module.
HB/1—Horizontal busbar insulation module.
HB/2—Horizontal busbar insulation module.
AA—M6 bolt connection through.
BB—M6 nut.
CC—copper connection.

It can therefore be seen from FIG. 10 that it is possible to make an electrical connection, by means of the copper connection CC between horizontal busbar 4h1 and vertical busbar 4vh.

Traditional construction methodology requires the switchgear and control to be mounted in a separate 'module' and then connected to the busbar system. The arrangement can be expensive and, time consuming to assemble and difficult to maintain. A further feature of an insulated busbar assembly according to an embodiment of the present invention is that it has a number of mounting provisions within the moulding of the support. These mounting provisions are provided on the front face of the support and can be used to mount switchgear and control gear directly to the busbar system without the need for additional modules. This facilitates easier assembly and maintenance and reduces the possibility of creating short circuits or arcing faults.

The busbar support also has provision to mount a shutter mechanism to it. When using a withdrawable switchgear and control gear module which is common in MCCs it is necessary to have a 'plugin' connection. Therefore each window in the busbar support must be removed so that a plug can connect to the busbar. When the module is removed the busbar is then exposed, in this design requirement a shutter mechanism will be mounted directly to the busbar insulating support.

Fully insulated busbars provide much improved operator safety when it is necessary for an operator to carry out maintenance work on the LVSCA while the system is still energised. There is a reduced danger of inadvertent contact with live parts and the danger of wires or tools creating electrical faults is practically eliminated.

The standardization of busbar size and matrix busbar system used in preferred embodiments of the present invention reduces the design and engineering input and also the technical expertise of the personnel required during the assembly process.

The modular matrix concept of the insulated busbar system ensures that every application can be verified as compliant with type test certification. This can be guaranteed when the LVSCA is built in accordance with the instructions as all connections are on the predetermined matrix.

A busbar system is the fundamental building block of any LVSCA. However generally manufacturers design all other elements and then work out how to connect it all together. The design concept behind the present invention is to develop a matrix insulated busbar system and then build all other aspects around it. Ultimately the busbar system is only a part of the LVSCA, additional components are still required such as a metal enclosure, a connection system to the busbar, a switchgear and controlgear compartment and cable access for both supply of power and distribution of power to the field devices.

A preferred embodiment of the present invention has been described with particular reference to a 50 mm inter-window spacing and also with reference to the dimensions of preferred busbars. It will be realised that the invention is not limited to any particular dimensions since the dimensions may be varied depending on the application and whether a metric or imperial system of measurement is standard where the invention is implemented. Furthermore, the preferred embodiment of the invention has been concerned with a three phase insulated busbar system which entailed four pairs of busbars (one for each phase and one for neutral) so that the modules provided a square array (or "matrix") of 4 4×4=16 connection points and detachable windows thereover. However, the system may be readily modified to accommodate a different number of windows within a different matrix. Further variations will also be apparent to those skilled in the art.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

Features, integers, characteristics, compounds, chemical moieties or groups described in conjunction with a particular aspect, embodiment or example of the invention are to be understood to be applicable to any other aspect, embodiment or example described herein unless incompatible therewith.

The claims defining the invention are as follows:

1. An interconnection and insulation module arranged to locate about a plurality of busbar pairs, each busbar pair including first and second electrically insulated busbars with an inter-busbar gap therebetween, the interconnection and insulation module including: opposed sides for accommodating the busbar pairs therebetween; corresponding windows formed through the opposed sides; and formations extending from interior surfaces of at least one of the opposed sides to locate and provide inter-busbar gaps for each busbar pair between one or more of the corresponding windows; whereby passages are defined between the corresponding windows of the opposed sides via the inter-busbar gaps for insertion of an electrical interconnection member; and wherein each of the inter-busbar gaps provided by the formations are less than each of the inter-busbar gaps between two adjacently located busbar pairs accommodated between the opposed sides of the module, wherein the electrical interconnection member further comprises a bolt configured for coupling the busbars and wherein the interconnection and insulation module further comprises a cover configured for covering an end of the bolt.

2. A module according to claim 1, wherein the windows formed through the opposed sides are in respective square arrays.

3. A module according to claim 1, wherein the opposed sides comprise first and second opposed portions.

4. A module according to claim 3, wherein busbar dividers extend from internal walls of the first and second portions.

5. A module according to claim 1, wherein opposed ends of the module include unidirectional mating formations whereby a number of modules may be interconnected end to end so that all of the number of modules are orientated in the same direction.

6. A module according to claim 1 including alignment formations located around a periphery of the module for assisting face-to-face alignment of windows of the module with another corresponding module in use.

7. A module according to claim 1 wherein the formation for locating the bus bar pairs include a number of separators which extend from one or more internal walls of the opposed sides and which penetrate a space between pairs of the busbars.

8. A module according to claim 1 including an endplate mounted across one end of the housing.

9. An insulated busbar assembly comprising: a first plurality of parallel busbars; and a module according to claim 1, disposed about the first plurality of parallel busbars.

10. The busbar assembly of claim 9 further including a second plurality of parallel busbars orthogonal to the first plurality of busbars and a second module disposed about the second plurality of parallel busbars wherein windows of the first module and windows of the second module are aligned.

11. The busbar assembly of claim 10 including one or more interconnection bolts disposed through aligned windows of the first module and the second module thereby interconnecting busbars of the first plurality of busbars with busbars of the second plurality of busbars.

12. An assembly comprising: a first plurality of parallel busbars; and a plurality of modules according to claim 1, disposed about the first plurality of parallel busbars, wherein each of the first plurality of busbar assemblies are contiguously covered by the plurality of modules.

13. A module according to claim 1, wherein the cover engages the corresponding windows by snap-fitting.

* * * * *